United States Patent
Armangau et al.

(10) Patent No.: US 9,201,802 B1
(45) Date of Patent: Dec. 1, 2015

(54) MANAGING READ/WRITE LOCKS FOR MULTIPLE CPU CORES FOR EFFICIENT ACCESS TO STORAGE ARRAY RESOURCES

(71) Applicant: EMC Corporation, Hopkinton, MA (US)

(72) Inventors: Philippe Armangau, Acton, MA (US); Chris Seibel, Walpole, MA (US); John A. Hassey, Durham, NC (US); Yubing Wang, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 349 days.

(21) Appl. No.: 13/731,197

(22) Filed: Dec. 31, 2012

(51) Int. Cl.
*G06F 12/00* (2006.01)
*G06F 12/08* (2006.01)
*G06F 9/52* (2006.01)
*G06F 12/02* (2006.01)

(52) U.S. Cl.
CPC ............ *G06F 12/0875* (2013.01); *G06F 9/526* (2013.01); *G06F 12/0261* (2013.01)

(58) Field of Classification Search
CPC .... G06F 12/02; G06F 12/0261; G06F 12/084
See application file for complete search history.

(56) References Cited

U.S. PATENT DOCUMENTS

| | | | |
|---|---|---|---|
| 6,067,587 A | 5/2000 | Miller et al. | |
| 7,194,467 B2 | 3/2007 | Holland | |
| 8,205,062 B2 | 6/2012 | Rushworth et al. | |
| 8,661,068 B1 | 2/2014 | Seibel et al. | |
| 2007/0094669 A1* | 4/2007 | Rector et al. | 718/104 |
| 2008/0183979 A1* | 7/2008 | Larson et al. | 711/154 |
| 2012/0158683 A1* | 6/2012 | Whitehouse | 707/704 |
| 2013/0290967 A1* | 10/2013 | Calciu et al. | 718/102 |
| 2014/0108728 A1* | 4/2014 | Nguyen | 711/118 |

* cited by examiner

*Primary Examiner* — Cheng-Yuan Tseng
*Assistant Examiner* — Arvind Talukdar
(74) *Attorney, Agent, or Firm* — BainwoodHuang (57) ABSTRACT

A technique for managing resources on a storage array having multiple CPU cores releases share locks on a resource by decrementing share lock counters associated with the CPU cores that release the share locks, regardless of whether these are the same as the CPU cores that acquired the share locks. As each CPU core changes its own share lock counter, cache trashing caused by changing share lock counters associated with other CPU cores can be avoided.

23 Claims, 5 Drawing Sheets

MANAGING READ/WRITE LOCKS FOR MULTIPLE CPU CORES FOR EFFICIENT ACCESS TO STORAGE ARRAY RESOURCES

BACKGROUND

Computerized systems for controlling data storage arrays typically include processors (i.e., "storage processors") having multiple cores, where each core is its own CPU (central processing unit) having its own cache. In a typical arrangement, client computing systems, also known as "hosts," access a storage processor on an array, e.g., over a network, to perform various operations, such as reading and writing files or designated block addresses on the array. Requests from hosts to read or write data on the array are processed in IO paths of the storage processor, via the CPU cores.

Storage processors typically include software components called "mutexes" for managing access to array resources, such as files and data objects stored on the array, as well as LUNs (logical storage units), slices of LUNs, snapshots of file systems, and other resources. Mutexes generally manage both exclusive and non-exclusive access to resources. For example, a read/write mutex can set and release exclusive locks on a resource and can also set and release non-exclusive locks. Non-exclusive locks are also known as "share locks." Write operations to a resource typically require exclusive locks, whereas read operations can generally be performed with share locks.

Computer software constructs for storage processors typically define mutex classes for managing resources on an array. The mutex classes may be implemented as C++ or Java classes, for example, and may be instantiated for managing particular resources on the array. According to a conventional object model, a mutex class is defined to include a mutex sub-class. The mutex sub-class is subordinate to the mutex class and helps to manage resources on a per-core basis. For example, to manage a resource on a storage processor having sixteen cores, a mutex object is instantiated, along with sixteen mutex sub-objects of the mutex object, one for each CPU core. Each mutex sub-object includes a share lock counter, which maintains a count of share locks applied to the resource by the respective CPU core. When a read request arrives to access the resource (e.g., from a host), a particular CPU core of the storage processor processes the request. The CPU core increments the share lock counter of the sub-object for the CPU core processing the read request, to indicate that a new share lock has been acquired on the resource. Later, to release the share lock, the share lock counter of the same sub-object (i.e., for the same CPU core) is decremented. In this manner, the mutex keeps track of share locks on a per-core basis.

SUMMARY

Unfortunately, conventional mutexes for multi-core storage processors can cause "cache trashing" when releasing share locks. For example, a first CPU core of a storage processor may place a share lock on a resource by instantiating the mutex in the cache of the first CPU core and incrementing the share lock counter of the mutex sub-object specific to the first CPU core. Later, a second CPU core may be called upon to release the share lock. The second CPU core instantiates its own version of the mutex, including the sub-objects, in its own cache. When the second CPU core goes to release the share lock on the resource, it decrements the share lock counter of the sub-object for the first CPU core in the second CPU core's cache. When this happens, the region of the first CPU core's cache storing the mutex sub-object for the first CPU core is invalidated, as it no longer reflects the proper value of its own share lock counter. In a storage processor handling up to hundreds of IOs per second with many CPU cores, the effects of such cache trashing can accumulate and significantly impair efficiency.

In contrast with the prior approach, which releases share locks by decrementing share lock counters of mutex sub-objects for the same CPU cores that acquired the share locks, an improved technique for managing resources on a storage array releases share locks by decrementing the share lock counters associated with the CPU cores that release the share locks, regardless of whether these are the same as the CPU cores that acquired the share locks. As each CPU core changes the share lock counter of its own mutex sub-object, cache trashing caused by changing share lock counters of other CPU cores' mutex sub-objects is typically avoided.

Certain embodiments are directed to a method for managing access to resources of a storage array. The method is operable on a computerized system having multiple CPU cores and includes creating an instance of a mutex object that includes a mutex sub-object for each of the CPU cores. Each mutex sub-object has a share lock counter. The method further includes receiving a request to obtain non-exclusive access to a resource of the storage array and executing, a first set of instructions on a first CPU core of the computerized system having a cache, to acquire a share lock on the resource, including incrementing the share lock counter of the mutex sub-object for the first CPU core in the cache of the first CPU core. The method still further includes executing a second set of instructions on a second CPU core of the computerized system having a cache, to release the share lock on the resource acquired by the first set of instructions executing on the first CPU core, including decrementing the share lock counter of the mutex sub-object for the second CPU core in the cache of the second CPU core.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing resources on a storage array having multiple CPU cores releases share locks on a resource by decrementing share lock counters associated with the CPU cores that release the share locks, regardless of whether these are the same as the CPU cores that acquired the share locks. As each CPU core changes its own share lock counter, cache trashing caused by changing share lock counters of other CPU cores is typically avoided.

Figure 1:
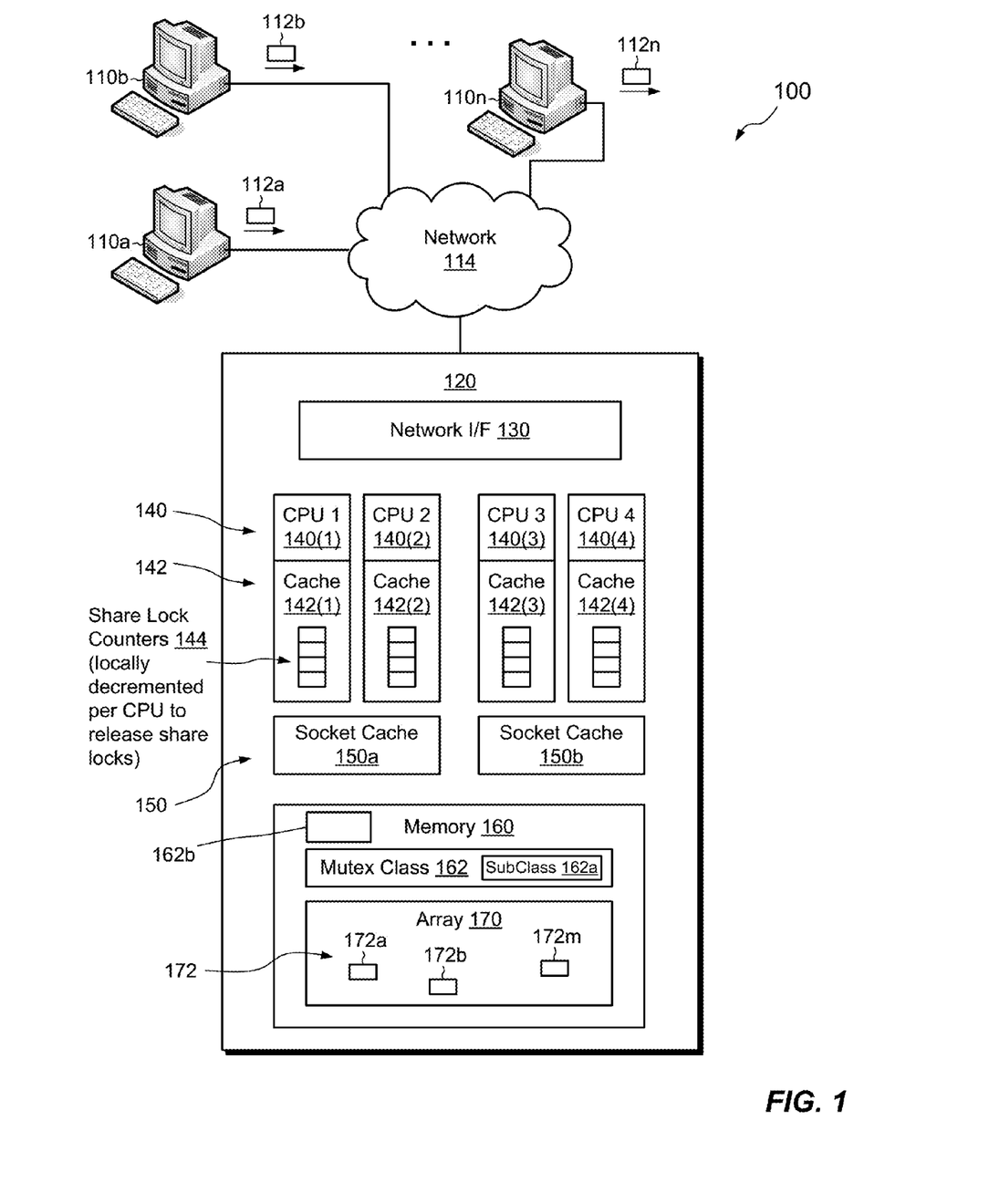
FIG. 1 is a block diagram of an example environment in which embodiments of the technique hereof can be practiced.

FIG. 1 shows an example environment 100 in which embodiments of the technique hereof can be practiced. Multiple client computing devices, shown as computing devices 110a through 110n, access a computerized apparatus 120 over a network 114. The computerized apparatus 120 includes a network interface 130, multiple CPU cores 140 (e.g., 140(1) through 140(4)), CPU socket caches 150 (e.g., 150a and 150b), and memory 160. The CPU cores 140 have respective local caches 142 (e.g., 142(1) through 142(4)). The local caches 142 include respective share lock counters 144. Although four CPU cores are shown, it is understood that any number of CPU cores may be provided. A typical implementation may include 16 cores, for example. The socket caches 150 may be provided in implementations where multiple CPU cores 140 share a common socket. The socket caches 150 are not required in all implementations, however. In addition, various implementations may include shared caches between certain processor cores, irrespective of any sockets, and may employ multi-level caches.

The memory 160 includes both volatile memory, such as RAM, and non-volatile memory, such as one or more disk drives, solid state drives (SSDs), and the like. In an example, the memory 160 includes a storage array 170, e.g., multiple disk drives and/or solid state drives for storing large amounts of data. In one example, the computerized apparatus 120 is a storage unit such as a VNX-series network attached storage (NAS), available from EMC Corporation of Hopkinton, Mass. In an alternative arrangement, the array 170 is provided separately from the computerized apparatus 120, which connects to the array 170, e.g., over a network, over a Storage Area Network (SAN), via fiber optic cables, etc.

The array 170 includes resources 172, e.g., resources 172a-m. In various examples, the resources 172 are any of files, block address ranges, directories, LUNs, RAID groups, and/or any other identifiable physical or logical resources on the array 170 for which exclusive and/or non-exclusive access can be managed.

The memory 160 also includes a mutex class definition 162. In an example, the mutex class definition 162 is stored in a software module and loaded into non-volatile memory (e.g., RAM) for execution. The mutex class definition 162 may be implemented using C++, Java, or any other language or combination of languages that support object-oriented programming. In an example, the mutex class definition 162 defines a read/write mutex, i.e., a software construct for managing both read and write access to resources. This is not required, however. For instance, the mutex class definition 162 may define a read mutex, which manages access to resources for reading only. The mutex class definition 162 includes a mutex sub-object class definition 162a, which may be instantiated multiple times to produce a different sub-object for each of the CPU cores (e.g., one sub-object for each of the cores 140(1-4)). The mutex sub-object definition 162a defines a share lock counter, such that each instantiated sub-object includes a respective share lock counter 144.

It is understood that the memory 160 may store a myriad of other software constructs and data, including one or more operating systems, hypervisors, file systems, applications, daemons, libraries, and so forth. These are omitted from FIG. 1 for the sake of clarity. It is also understood that the CPU cores 140 and the memory 160 together form a specialized circuit, which is constructed and arranged to carry out the various processes and functions, as described herein. Further, the memory 160 stores instructions (including those for the mutex class definition 162), which, when executed by any of the CPU cores 140, cause such CPU core(s) 140 to carry out the various processes and functions described herein.

In operation, the computerized apparatus 120 receives requests 112a-n from the computing devices 110a-n, respectively. In an example, each of the requests 112a-n seeks to obtain non-exclusive access to a particular file, represented by 172a, stored on the array 170, for the purpose of reading the file. In response to the request 112a, which may be a first to arrive, a thread is created on a particular CPU core (e.g., on CPU 1) to process the request. The thread references the mutex class definition 162 and may proceed to instantiate a mutex object 162b based on the mutex class definition 162. The mutex object 162b includes multiple sub-objects, including a different sub-object for each CPU core. For example, where the computerized apparatus 120 includes four CPU cores (as shown), the mutex object is instantiated with four mutex sub-objects. Each mutex sub-object includes a respective share lock counter 144. The mutex object 162b may be stored in the memory 160 and partially (or completely) mirrored in the cache 142(1) of the CPU core 140(1). In an example, only the mutex sub-object for CPU 1 is mirrored to the cache 142(1) of CPU 1.

To obtain a non-exclusive lock (share lock) on the resource 170a, the thread running on CPU 1 may invoke a spin lock mutex. As is known, spin lock mutexes prevent changes to identified data structures for short periods of time, effectively causing other threads attempting to access the data structures to wait and "spin" while actions are being completed. The spin lock mutex also serves to serialize requests to access the identified data structures until it is released. Here, a spin lock mutex is applied to the mutex sub-object for the CPU core processing the request (i.e., the mutex sub-object for CPU 1).

While the spin-lock mutex is in effect, the thread processing the request on CPU 1 executes a set of instructions to acquire a share lock on the resource 172a. The set of instructions includes incrementing the local copy, held in the cache 142(1), of the share lock counter 144 for CPU 1 (i.e., the share lock counter 144 included in the mutex sub-object for CPU 1). When the set of instructions has been completed, the thread running on CPU 1 releases the spin lock mutex. In some examples, changes to the value of the share lock counter 144 for CPU 1 may be written back to memory 160, i.e., to update the mutex object 160b.

The thread accessing the resource 172a may continue to run on CPU 1 (to complete the read operation on the resource 172a). A spin-lock mutex may be invoked to release the share lock on CPU 1. Releasing the share lock on CPU 1 includes decrementing the share lock counter 144 for CPU 1 in the cache 142(1).

Sometimes, the thread is not run to completion on CPU 1 but is rather suspended and resumed on another CPU core, such as CPU 4. The thread running on CPU 4 may then take action to release the share lock on the file 172a, which was acquired by CPU 1.

As before, the thread running on CPU 4 may invoke a spin lock mutex to protect the mutex sub-object associated with CPU 4 and to serialize later-arriving requests (e.g., requests 112b-n). The thread mirrors the mutex object 162b from memory 160 to the cache 142(4). The mutex object 162b includes the mutex sub-object for CPU 4, but typically does not include the sub-objects for the other cores. The resumed thread executes another set of instructions to release the share lock on the resource 172a. The set of instructions includes decrementing a local copy, held in the cache 142(4), of the share lock counter for CPU 4 (i.e., the share lock counter 144 included in the mutex sub-object for CPU 4). When this set of instructions has been completed, the spin lock mutex is released. Changes in the value of the share lock counter 144 for CPU 4 may be written back to memory 160, i.e., to update the mutex object 160a.

Rather than decrementing the share lock counter 144 associated with CPU 1, the above-described technique instead decrements the share lock counter 144 associated with CPU 4. This technique thus avoids the need to invalidate (trash) the local cache 142(1) of CPU 1, in this example, as the value of the share lock counter 144 for CPU 1, held in CPU 1's cache 142(1), remains unchanged.

As described, spin lock mutexes apply to individual sub-objects of a mutex object. This feature promotes parallelism as it enables one mutex sub-object for a resource to be locked while the other mutex sub-objects for the resource remain free to be accessed and modified. For example, CPU 1 may apply a spin lock mutex to lock the mutex sub-object for CPU 1, but the mutex sub-object for CPU 4 remains free to be processed and modified by CPU 4 (or some other CPU). Thus, multiple mutex sub-objects can be processed at the same time, in parallel, to further promote efficiency.

Spin lock mutexes may also be used for acquiring exclusive locks. For exclusive locks, however, all sub-objects of a mutex object for a resource must be locked at the same time, i.e., all mutex sub-objects for the resource must be locked exclusively. In some examples, other types of mutexes (besides spin-lock mutexes) may be used for exclusively locking mutex sub-objects.

It is understood that the above-described technique can operate whenever any first CPU core (i.e., any of the cores 140(1-4)) establishes a share lock and any second CPU core (i.e., any other of the cores 140(1-4)) releases the share lock. The technique can be used with any number of CPU cores. For load balancing, it is expected that the "first CPU" and the "second CPU" will be different for different requests. The technique can be used with any number of requests 112a-n, with each request being managed essentially as described above. Any number of resources 172a-m may be managed this way, simultaneously. For example, the computerized apparatus 120 may process hundreds of IO requests per second for access to hundreds of different resources 172a-m. A different mutex object 162a can be instantiated for each resource. Thus, hundreds or more mutex object instances 162a can be resident in the memory 160 (and in the local caches 142(1-4)) at any given time.

Sometimes, a thread attempting to release a share lock may be unable to decrement the share lock counter for its own mutex sub-object (i.e., the sub-object corresponding to the CPU core that is running the thread) because that share lock counter indicates a zero value. When this occurs, the thread instead decrements the share lock counter for the sub-object for another CPU. For example, if a thread running on CPU 4 goes to release a share lock, and the share lock counter for CPU 4 already reads zero, the thread may instead decrement the share lock counter for CPU 1, CPU 2, or CPU 3. The counter to be decremented resides in the cache 142(4) of CPU 4, but it is part of the mutex sub-object for a different CPU. Cache trashing may not be avoided in this instance, as CPU 4 will change the share lock counter value for another CPU in CPU 4's own cache 142(4), thus invalidating the value of the same count stored in the other CPU's cache. Circumstances in which a share lock counter reads zero are relatively rare, however, such that the effects of such cache trashing on performance are usually minimal.

Where the share lock counter of a CPU's mutex sub-object already reads zero and the CPU shares a common cache with another CPU, the share lock counter to be decremented is preferably selected to be the share lock counter for the CPU that shares the common cache. For example, if the counter for CPU 4 already indicates zero share locks, the thread running on CPU 4 may attempt to decrement the share lock counter for CPU 3 (in the cache 142(4)), since CPU 3 and CPU 4 share a common cache (the socket cache 150b). Only if the share lock counter for CPU 3 also reads zero does the thread attempt to decrement another counter, such as the counter for CPU 1 or for CPU 2. Preferentially decrementing the share lock counter for a CPU that shares a common cache with the CPU running the thread reduces the impact of cache trashing on overall performance, as the CPU running the thread can generally access and update the shared cache much more quickly than it can update the caches of CPUs with which caches are not shared.

In some examples, the mutex object 162b exists in memory 160 independent of any particular thread, but rather as a shared object that may be used by multiple threads running on the computerized apparatus 120. Thus, rather than being thread-specific, each of the mutex objects may be regarded as resource-specific.

Figure 2:
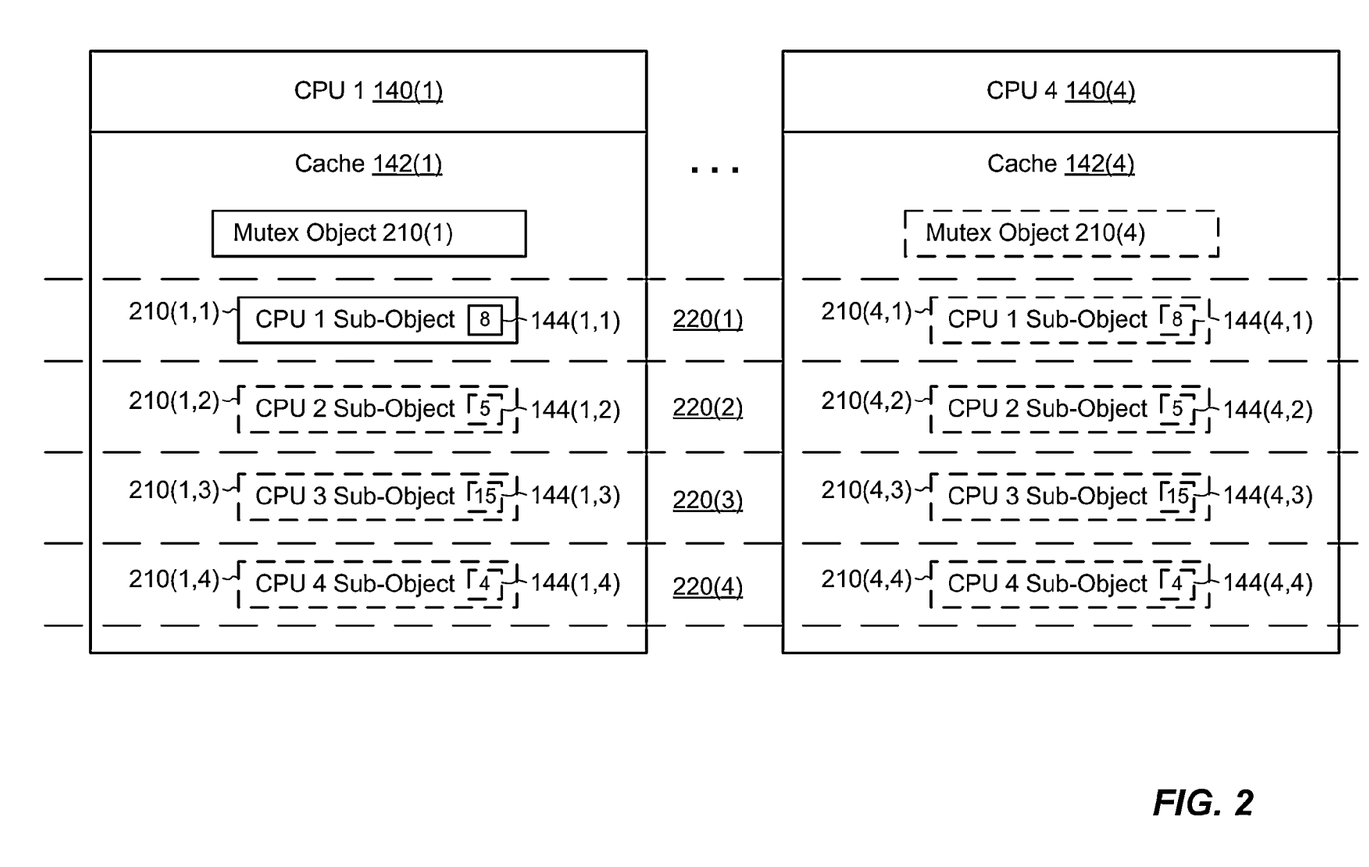
FIGS. 2-4 are block diagrams showing example changes in share lock counter values as share locks are acquired and released on a resource in an environment such as that shown in FIG. 1.
Figure 3:
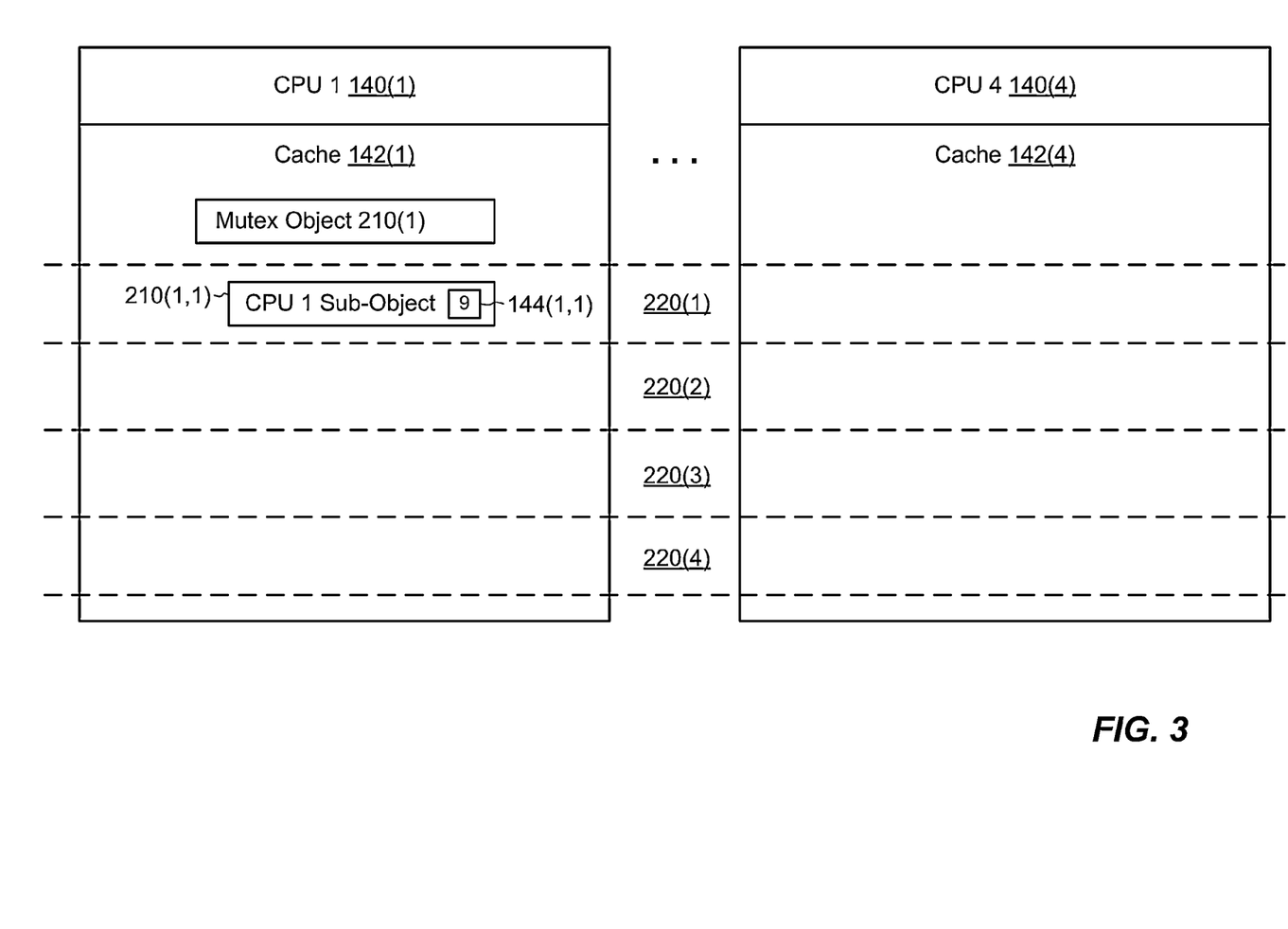
Figure 4:
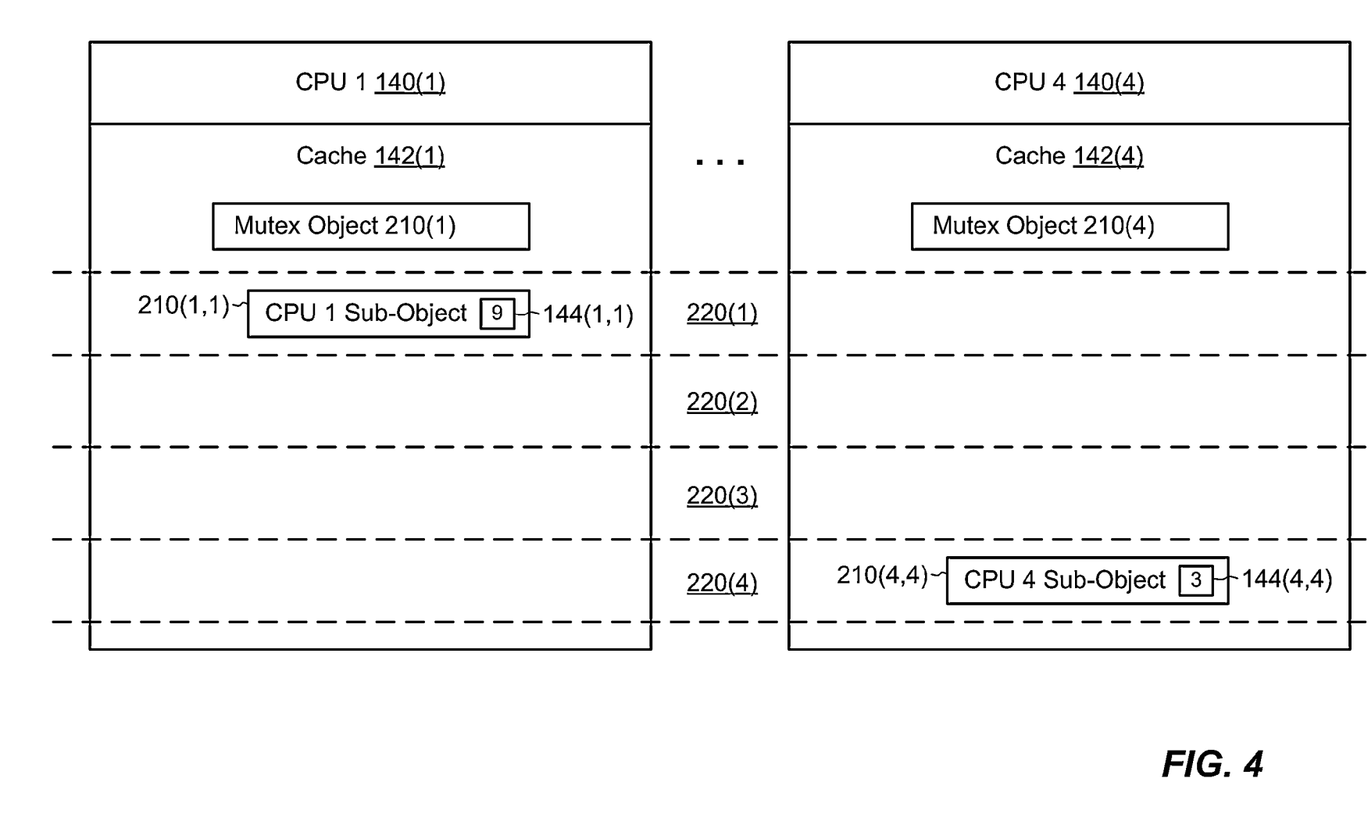

FIGS. 2-4 show an example of changes to share lock counter values when acquiring and releasing a share lock. In this example, only CPU 1 and CPU 4, and their associated caches 142(1) and 142(4), are shown. However, it is understood that this example can be applied generally to any pair of CPU cores in the computerized apparatus 120.

FIG. 2 shows an initial condition, where a mutex object 162b has been instantiated in memory 160 and mirrored to the cache 142(1) of CPU 1. Typically, only the mutex sub-object for CPU 1 (i.e., 210(1,1)) is mirrored to the cache 142(1). The mutex sub-object 210(1,1) includes a share lock counter 144(1,1), having an initial value of 8. Other mutex sub-objects and counters for the cache 142(1) are shown in dashed lines to indicate locations where these sub-objects may be cached in other examples. In this initial condition, the cache 142(4) contains no mutex object or sub-object. However, the initial value of the share lock counter for CPU 4 (stored in memory 160) is 4.

In an example, the mutex sub-objects, along with their respective share lock counters 144, are cache-aligned, such that they occupy corresponding locations between the two caches 142(1) and 142(4) (and, more generally, among all the caches 142(1-4)). For example, the core 1 sub-objects 210(1,1) to 210(4,1) are stored in a first set of cache lines 220(1), the core 2 sub-objects 210(1,2) to 210(4,2) are stored in a second set of cache lines 220(2), the core 3 sub-objects 210(1,3) to 210(4,3) are stored in a third set of cache lines 220(3), and the core 4 sub-objects 210(1,4) to 210(4,4) are stored in a fourth set of cache lines 220(4). In one example, the different sets of cache lines 220(1-4) correspond to the same physical cache addresses across the different caches. In another example, the different sets of cache lines 220(1-4) correspond to the same logical addresses, but to different physical addresses. An objective of cache-aligning the mutex sub-objects is to limit the amount of cache invalidated when incrementing share lock counters. For example, when incrementing a share lock counter for a particular CPU's cache, only the portion of cache in the same set of cache lines is invalidated in other CPUs' caches.

FIG. 3 shows the state of the share lock counter 144(1,1) after a thread running on CPU 1 has acquired a new share lock (e.g., in response to the computerized apparatus 120 receiving the request 112a. Here, the value of share lock counter 144 (1,1) has been incremented from 8 to 9.

FIG. 4 shows the state of the share lock counters 144(1,1) and 144(4,4) after the thread on CPU 1 that acquired the share lock is suspended and resumed on CPU 4. The mutex object 162b and the sub-object for CPU 4 have been mirrored to the cache 142(4) of CPU 4. Here, the share lock counter 144(4,4) for CPU 4 has been decremented (changed from an initial value of 4 to 3) to reflect the release of the share lock that was acquired by CPU 1. The change to the share lock counter 144(4,4) may be mirrored back to the mutex object 162b in memory 160. No change has been made to the share lock counter 144(1,1) for CPU 1. Therefore, no cache trashing has occurred.

If the value of the share lock counter 144(4,4) of CPU 4 had initially been 0 instead of 4, the share lock counter 144(4,4) could not have been decremented. Here, another share lock counter for another sub-object would be decremented. Although decrementing a different counter may cause cache trashing, such occurrences are relatively rare. Even when they do occur, the amount of cache invalidated is limited to the set of cache lines (any of 220(1-4)) that the sub-objects occupy.

Figure 5:
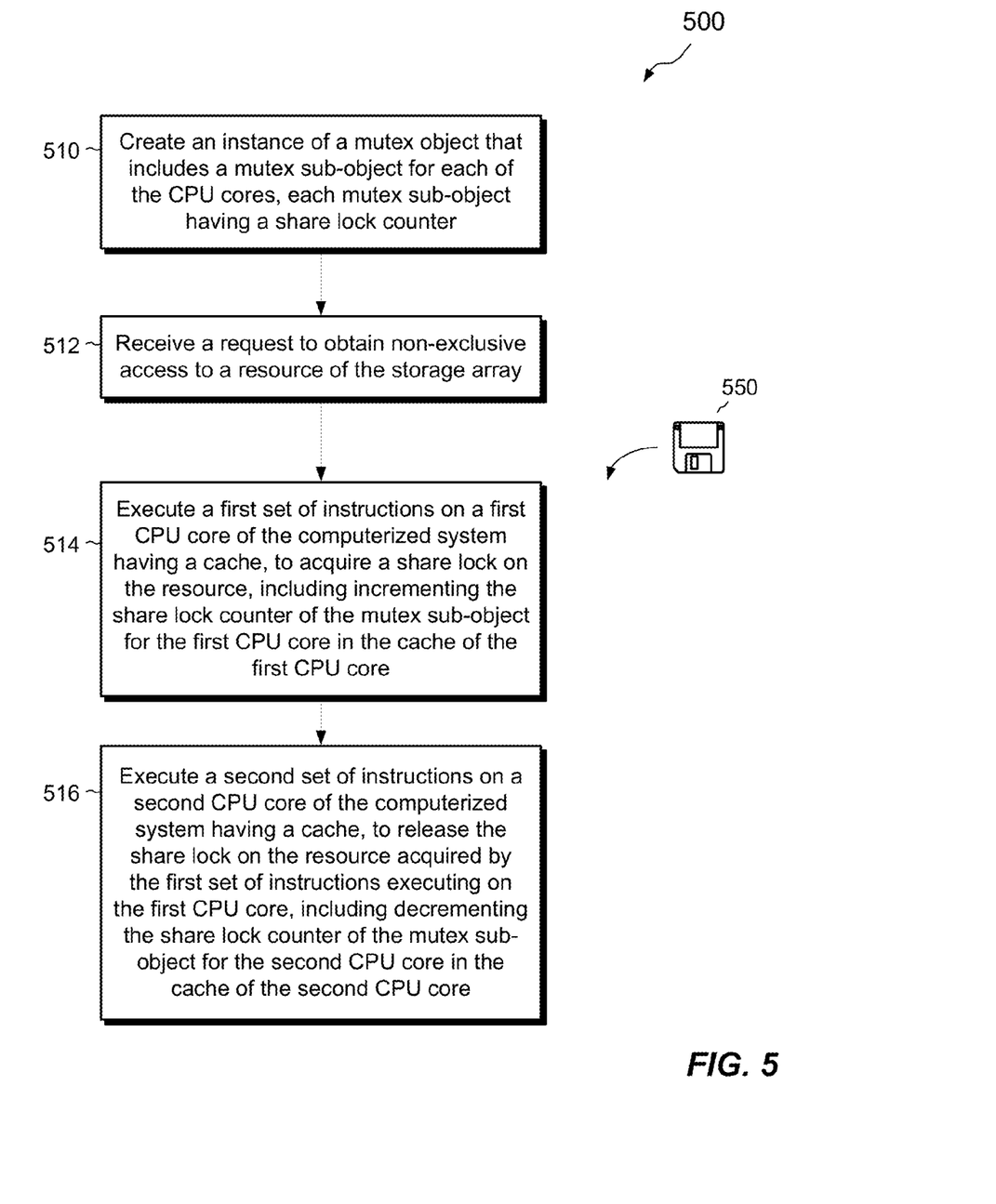
FIG. 5 is a flow chart showing a process for managing access to a resource in an environment such as that shown in FIG. 1

FIG. 5 shows a process 500 for managing access to resources in a storage array in a computerized system having multiple CPU cores. The process 500 may be carried out in connection with the computing environment 100 and is typically performed by the software constructs, described in connection with FIG. 1, which reside in the memory 160 of the computerized apparatus 120 and are run by the CPU cores 140. The various acts of this process may be ordered in any suitable way. Accordingly, embodiments may be constructed in which acts are performed in orders different from those illustrated, which may include performing some acts simultaneously, even though the acts are shown as sequential in the illustrated embodiments.

At step 510, an instance of a mutex object is created. The mutex object includes a mutex sub-object for each of the CPU cores. Each of the mutex sub-objects has a share lock counter. For example, the mutex object 162b is instantiated in memory 160 to manage access to the resource 172a on the array 170.

At step 512, a request is received to obtain non-exclusive access to a resource of the storage array. For example, the computing device 110a may issue a read request 112a, which is received by the computerized apparatus 120 over the network 114. Steps 510 and 512 can occur in any order, or simultaneously.

At step 514, a first set of instructions is executed on a first CPU core, having a cache, to acquire a share lock on the resource, including incrementing the share lock counter of the mutex sub-object for the first CPU core in the cache of the first CPU core. For example CPU 1 may execute one or more instructions to acquire a share lock on the resource 172a, which includes incrementing the share lock counter 144(1,1) in the cache 142(1).

At step 516, a second set of instructions is executed on a second CPU core, having a cache, to release the share lock on the resource acquired by the first set of instructions executing on the first CPU core, including decrementing the share lock counter of the mutex sub-object for the second CPU core in the cache of the second CPU core. For example, CPU 4 may execute one or more instructions to release the share lock on the resource 172a, which includes decrementing the share lock counter 144(4,4) in the cache 142(4). Cache trashing is therefore avoided.

A technique has been described for managing resources on a storage array having multiple CPU cores 140. The technique releases share locks on a resource by decrementing share lock counters 144 associated with the CPU cores 140 that release the share locks, regardless of whether these are the same as the CPU cores that acquired the share locks. As each CPU core changes its own share lock counter, cache trashing caused by changing share lock counters associated with other CPU cores can be avoided.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Further, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 550 in FIG. 5). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method, operable on a computerized system having multiple CPU cores, for managing access to resources of a storage array, comprising:
  creating an instance of a mutex object that includes a mutex sub-object for each of the CPU cores, each mutex sub-object having a share lock counter;
  receiving a request to obtain non-exclusive access to a resource of the storage array;
  executing a first set of instructions on a first CPU core of the computerized system, the first CPU core having its own cache, to acquire a share lock on the resource, including incrementing the share lock counter of the mutex sub-object for the first CPU core in the cache of the first CPU core; and
  executing a second set of instructions on a second CPU core of the computerized system, the second CPU core having its own cache, to release the share lock on the resource acquired by the first set of instructions executing on the first CPU core, including decrementing the share lock counter of the mutex sub-object for the second CPU core in the cache of the second CPU core,
  wherein instantiating the mutex object includes instantiating the mutex object within a memory shared among the multiple CPU cores.

2. The method of claim 1, wherein the first set of instructions is part of a thread running on the first CPU core, and wherein the method further comprises:
    prior to executing the first set of instructions, invoking a spin lock mutex in the thread running on the first CPU core, to serialize a set of requests for accessing the resource that arrive while the first set of instructions is being executed; and
    releasing the spin lock mutex after executing the first set of instructions.

3. The method of claim 2, wherein the second set of instructions is part of a thread running on the second CPU core, and wherein the method further comprises:
    prior to executing the second set of instructions, invoking a spin lock mutex in the thread running on the second CPU core, to serialize a set of requests for accessing the resource that arrive while the second set of instructions is being executed; and
    releasing the spin lock mutex after executing the second set of instructions.

4. The method of claim 2, wherein the spin lock mutex applies to a particular sub-object of the mutex object for the resource and not to other sub-objects of the mutex object for the resource, and wherein the method further comprises modifying another sub-object of the mutex object for the resource after the spin lock mutex has been invoked and before the spin lock mutex has been released.

5. The method of claim 3, wherein the first CPU core and the second CPU core each have a respective cache, wherein the first sub-object and the second sub-object are cache-aligned in the respective caches.

6. The method of claim 3, further comprising:
    receiving a second request to obtain non-exclusive access to the resource of the storage array;
    executing, on the first CPU core, the first set of instructions to acquire a second share lock on the resource, including incrementing the share lock counter of the mutex sub-object for the first CPU core;
    executing the second set of instructions on the second CPU core to release the second share lock on the resource acquired by the first set of instructions executing on the first CPU core, including decrementing the share lock counter of the mutex sub-object for a CPU core other than the second CPU core in response to the share lock counter of the mutex sub-object for the second CPU core indicating zero share locks.

7. The method of claim 6, wherein the mutex sub-object for the CPU core other than the second CPU is not the first CPU core.

8. The method of claim 6, wherein decrementing the share lock counter of the mutex sub-object for the CPU core other than the second CPU core includes:
    checking the share lock counter of the sub-objects for each of the other CPU cores to find a sub-object whose share lock counter has a value that indicates a non-zero number of share locks; and
    decrementing the share lock counter of the found sub-object.

9. The method of claim 6, wherein the second CPU core shares a common cache with at least one other CPU core of the computerized system, and wherein decrementing the share lock counter of the mutex sub-object for the CPU core other than the second CPU core includes:
    checking the share lock counter of the sub-object for the other CPU core(s) that share the common cache with the second CPU core to find a sub-object whose share lock counter has a value that indicates a non-zero number of share locks; and
    decrementing the share lock counter of the found sub-object.

10. The method of claim 9, wherein the second CPU core and at least one of the other CPU core(s) that share the common cache with the second CPU core share a common socket.

11. The method of claim 1, wherein the sub-object for each CPU core itself includes a read/write mutex that manages both share locks and exclusive locks for the resource.

12. The method of claim 1, wherein instantiating the object includes accessing a class definition of the object from a memory of the computerized system, the memory being shared by the CPU cores, the class definition including functions for acquiring and releasing share locks and exclusive locks for specified resources.

13. A computerized apparatus, comprising:
    multiple CPU cores; and
    memory, coupled to the CPU cores, the memory storing executable instructions, which when executed by the CPU cores cause the CPU cores to perform a method for managing access to resources of a storage array, the method comprising:
    creating an instance of a mutex object that includes a mutex sub-object for each of the CPU cores, each mutex sub-object having a share lock counter;
    receiving a request to obtain non-exclusive access to a resource of the storage array;
    executing a first set of instructions on a first CPU core of the computerized system, the first CPU core having its own cache, to acquire a share lock on the resource, including incrementing the share lock counter of the mutex sub-object for the first CPU core in the cache of the first CPU core; and
    executing a second set of instructions on a second CPU core of the computerized system, the second CPU core having its own cache, to release the share lock on the resource acquired by the first set of instructions executing on the first CPU core, including decrementing the share lock counter of the mutex sub-object for the second CPU core in the cache of the second CPU core,
    wherein instantiating the mutex object includes instantiating the mutex object within a memory shared among the multiple CPU cores.

14. The computerized apparatus of claim 13, wherein the first CPU core and the second CPU core each have a respective cache, wherein the first sub-object and the second sub-object are cache-aligned in the respective caches.

15. The computerized apparatus of claim 14, wherein the method further comprises:
    receiving a second request to obtain non-exclusive access to the resource of the storage array;
    executing, on the first CPU core, the first set of instructions to acquire a second share lock on the resource, including incrementing the share lock counter of the mutex sub-object for the first CPU core;
    executing the second set of instructions on the second CPU core to release the second share lock on the resource acquired by the first set of instructions executing on the first CPU core, including decrementing the share lock counter of the mutex sub-object for a CPU core other than the second CPU core in response to the share lock counter of the mutex sub-object for the second CPU core indicating zero share locks.

16. The computerized apparatus of claim 15, wherein the second CPU core shares a common cache with at least one other CPU core of the computerized system, and wherein decrementing the share lock counter of the mutex sub-object for the CPU core other than the second CPU core includes:
  checking the share lock counter of the sub-object for the other CPU core(s) that share the common cache with the second CPU core to find a sub-object whose share lock counter has a value that indicates a non-zero number of share locks; and
  decrementing the share lock counter of the found sub-object.

17. The computerized apparatus of claim 16, wherein the second CPU core and at least one of the other CPU core(s) that share the common cache with the second CPU core share a common socket.

18. A non-transitory computer readable medium including instructions which, when executed by multiple CPU cores of a computerized apparatus, cause the CPU cores to perform a method of managing access to resources of a storage array, the method comprising:
  creating an instance of a mutex object that includes a mutex sub-object for each of the CPU cores, each mutex sub-object having a share lock counter;
  receiving a request to obtain non-exclusive access to a resource of the storage array;
  executing a first set of instructions on a first CPU core of the computerized system, the first CPU core having its own cache, to acquire a share lock on the resource, including incrementing the share lock counter of the mutex sub-object for the first CPU core in the cache of the first CPU core; and
  executing a second set of instructions on a second CPU core of the computerized system, the second CPU core having its own cache, to release the share lock on the resource acquired by the first set of instructions executing on the first CPU core, including decrementing the share lock counter of the mutex sub-object for the second CPU core in the cache of the second CPU core,
  wherein instantiating the mutex object includes instantiating the mutex object within a memory shared among the multiple CPU cores.

19. The non-transitory computer readable medium of claim 18, wherein the first set of instructions is part of a thread running on the first CPU core, and wherein the method further comprises:
  prior to executing the first set of instructions, invoking a spin lock mutex in the thread running on the first CPU core, to serialize a set of requests for accessing the resource that arrive while the first set of instructions is being executed; and
  releasing the spin lock mutex after executing the first set of instructions.

20. The non-transitory computer readable medium of claim 18, wherein the method further comprises:
  receiving a second request to obtain non-exclusive access to the resource of the storage array;
  executing, on the first CPU core, the first set of instructions to acquire a second share lock on the resource, including incrementing the share lock counter of the mutex sub-object for the first CPU core;
  executing the second set of instructions on the second CPU core to release the second share lock on the resource acquired by the first set of instructions executing on the first CPU core, including decrementing the share lock counter of the mutex sub-object for a CPU core other than the second CPU core in response to the share lock counter of the mutex sub-object for the second CPU core indicating zero share locks.

21. The non-transitory computer readable medium of claim 20, wherein the second CPU core shares a common cache with at least one other CPU core of the computerized system, and wherein decrementing the share lock counter of the mutex sub-object for the CPU core other than the second CPU core includes:
  checking the share lock counter of the sub-object for the other CPU core(s) that share the common cache with the second CPU core to find a sub-object whose share lock counter has a value that indicates a non-zero number of share locks; and
  decrementing the share lock counter of the found sub-object.

22. The method of claim 1, wherein the multiple CPU cores are disposed on a single computerized apparatus.

23. The method of claim 22, further comprising:
  mirroring the mutex sub-object of the first CPU core from the memory to the cache of the first CPU core; and
  mirroring the mutex sub-object of the second CPU core from the memory to the cache of the second CPU core.

* * * * *